Oct. 5, 1926.
B. BURD
1,601,937
BUMPER AND LUGGAGE CARRIER FOR AUTOMOBILES
Filed March 2, 1925
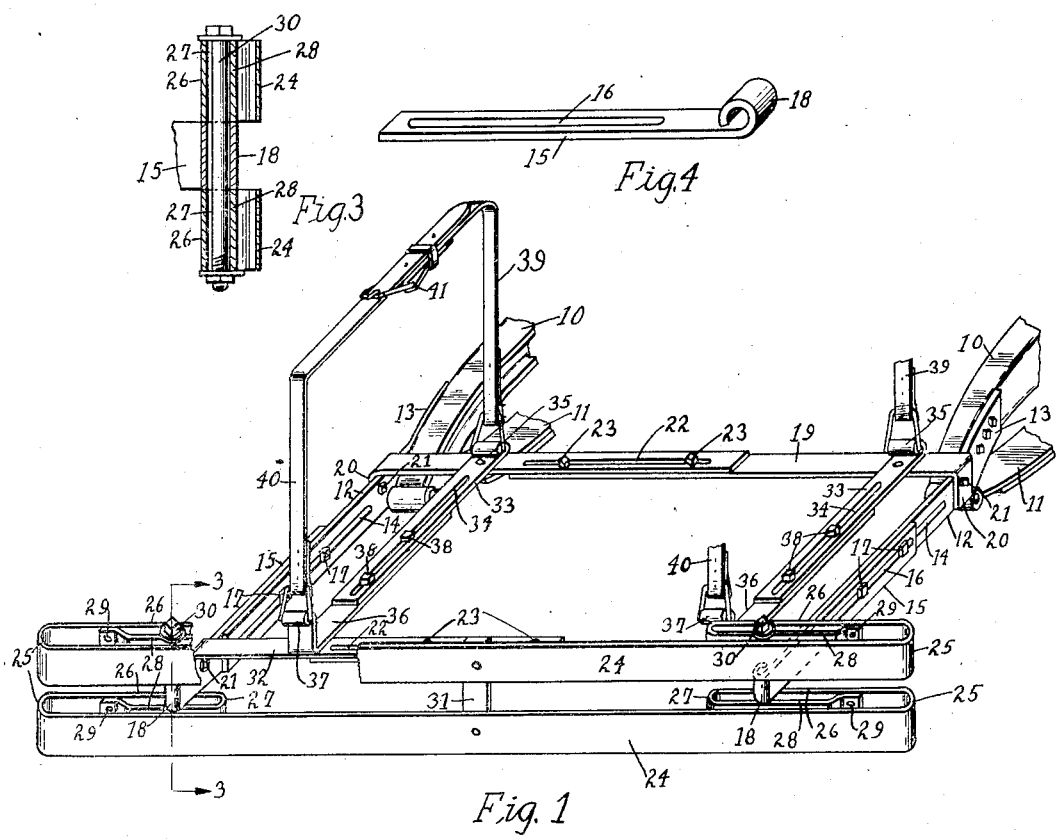
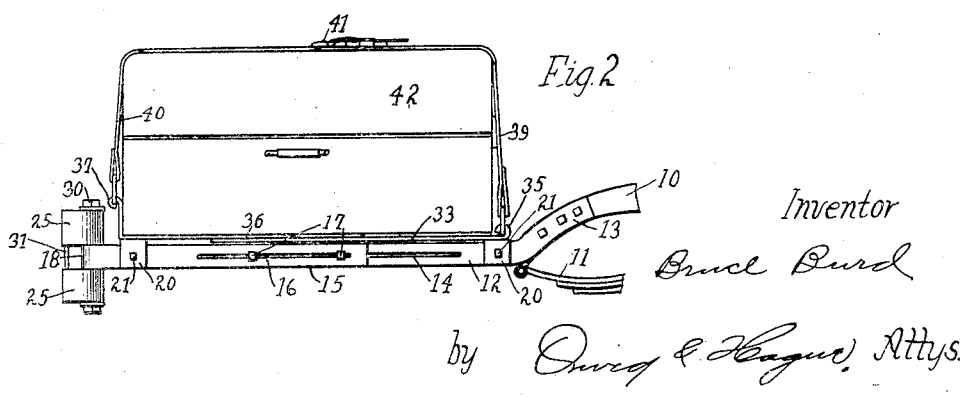
Inventor
Bruce Burd
by Owing & Hague Attys.

Patented Oct. 5, 1926.

1,601,937

UNITED STATES PATENT OFFICE.

BRUCE BURD, OF CLARINDA, IOWA.

BUMPER AND LUGGAGE CARRIER FOR AUTOMOBILES.

Application filed March 2, 1925. Serial No. 12,609.

The object of my invention is to provide a device of simple, durable and inexpensive construction that may be readily, quickly and easily attached to automobiles of various sizes and makes for the purpose of serving the combined function of a rear bumper and luggage carrier.

More specifically it is my object to provide a device of this kind which may be readily, quickly and easily adjusted to accurately fit the particular trunk or other piece of luggage to be carried, to the end that the bumper will not be spaced any farther from the automobile chassis than is necessary to accurately accommodate the trunk or other piece of luggage, and also to improve the appearance of the vehicle when carying a trunk or the like, for obviously the appearance of the vehicle would be detracted from if the rear bumper was projected a great distance from the chassis and also a great distance rearwardly from the trunk or other object being carried.

A further object is to provide a luggage carrier of this class to which a trunk or other object of any desired height may be readily, quickly and easily secured, in such manner as to be firmly held, and also in such manner as to avoid rubbing against the automobile body or being in any way interfered with when an object strikes the rear bumper.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a perspective view illustrating a part of an automobile chassis and my improved bumper and luggage carrier applied thereto, parts of the bumper being broken away to show the luggage carrier structure.

Figure 2 shows a side elevation of same with a trunk mounted upon and held in place upon the luggage carrier.

Figure 3 shows an enlarged, detail, sectional view on the line 3—3 of Figure 1.

Figure 4 shows an enlarged detail perspective view of one of the adjustable trunk supporting bars.

Referring to the accompanying drawings, I have used the reference numeral 10 to indicate the rear extensions of an automobile chassis to which the automobile springs 11 are connected. My improved bumper and luggage carrier comprises two bumpers supporting bars 12, each having a curved upwardly extending portion 13 designed to be bolted to the chassis member 10. These bars are extended straight rearwardly and are provided with longitudinal slots 14. At the rear of each of the bars 12 is a coacting bumper supporting bar 15 which is formed with a horizontal slot 16 in line with the slot 14, and two bolts 17 are extended through these slots, whereby the two bar members may be longitudinally adjusted relative to each other and firmly clamped in any adjusted position. At the rear of the bar member 15 I have provided a loop 18, for purposes hereinafter made clear.

At the forward ends of the bars 12 I have provided a luggage carrier supporting bar consisting of two members made of flat metal and indicated by the numeral 19. Each is formed with a downwardly extended portion at 20 permanently bolted to the adjacent bar 12 by the bolt 21. Their inner ends are formed with slots 22 and bolts 23 are passed through these slots whereby this bar 19 may be longitudinally adjusted to fit automobiles having chassis of different widths.

The bumper proper is formed of two members, each of flat spring metal and each comprising a straight body portion 24 having each end curved forwardly at 25 and then inwardly at 26 to a considerable distance toward the center of the bumper where it is again curved rearwardly at 27 and then outwardly at 28, its end being riveted to the inwardly turned portion 26 by the rivets 29, thus leaving a space between the parts 26 and 28 and also a space between the part 28 and the body of the bumper 24.

The length of these bumpers is great enough to provide a suitable bumper for any automobile, but since the width of the automobile frame members 10 varies in automobiles of different manufacture, it is necessary to provide for adjusting the bars 15 relative to the bumpers, and this is done in a simple and convenient manner with my construction by simply providing long bolts 30, shown in Figure 3, and extending them through the slots between the parts 26 and 28 and the loop 18 formed in the parts 15, and when said bolts are drawn tight, these parts are firmly secured together and firmly braced sufficiently for serving as an efficient bumper. I also preferably connect the upper and lower bumper members at the middle by a flat bar 31.

Connected to the bars 15 at the rear ends thereof is a second luggage supporting bar made of two parts overlappingly connected like the bar 19, and indicated generally by the reference numeral 32. These two bars 19 and 32 form the supports for the luggage carrier hereinafter described, and also serve to stiffen and reinforce the rearwardly extended bars which support the bumper.

The luggage carrier bars, of which two or more may be used, each comprise a flat bar member 33 riveted to one of the flat bar members 19 and extended rearwardly therefrom and formed with a slot 34. At its front end there is an upwardly extended loop 35. The rear luggage carrier bar member is indicated by the numeral 36 and has an upwardly extended loop portion at 37 and is riveted to the corresponding bar 32, and is also slotted to receive the bolts 38 by which longitudinal adjustment may be attained. A strap member 39 is connected to the loop 35 and a strap member 40 is connected to the loop 37, and these strap members may be connected by a buckle 41 of the ordinary kind.

In practical use and when the device is assembled on an automobile, then the bumper is firmly and securely supported, because it has four adjustable bars extending from it toward the automobile and two transverse flat bars connecting the longitudinal flat bar so it is braced in each direction against both lateral and up and down movement.

Notwithstanding this firm bracing of the bumper it may be adjusted toward and from the automobile readily, quickly and easily by manipulation of the bolts in the longitudinal adjustable bars.

Furthermore, the device may be readily and easily fitted to automobiles of different widths, because the transverse bars are also adjustable as to length. The bumper members are connected with the longitudinally arranged bars in such manner that no matter what the width of the automobile may be, the bars 12 and 15 extend straight rearwardly to their points of connection with the bumpers, and the bumpers are firmly and securely held to said bars toward each other by the bolts 30 which permits the desired adjustment.

When it is desired to carry a trunk or other article of luggage upon the luggage carrier, then the trunk, indicated in Figure 2 by the numeral 42, is placed upon the luggage supporting bars 33 and 36 and within the upwardly extended parts 35 and 37, as clearly shown in Figure 2. Then the straps are passed over the article and buckled tight. If the article to be carried is relatively narrow from front to rear, then the parts are so adjusted that the members 35 and 37 will loosely engage the front and rear of the trunk or other article, and when the article is thus strapped in position the efficiency of the bumper is in no way affected, because the bumper members cannot be moved forwardly enough to engage the trunk or other article, and if the bumper strikes on the end portions thereof, as is usually the case, the bumper body portion will bend forwardly only far enough to engage the part 28 of the bumper member which will cushion the impact and prevent injury to the bumper.

I claim as my invention:

1. A combined bumper and luggage carrier comprising, bars designed to be secured to an automobile chassis, a bumper adjustably secured longitudinally thereof to the rear ends of said bars, said bars being formed of two parts longitudinally adjustable with relation to each other, and two cross bars for connecting the bumper supporting bars at their front and rear end portions, said connecting bars being each also formed with two parts adjustably connected.

2. A combined bumper and luggage carrier comprising, bars designed to be secured to an automobile chassis, a bumper adjustably secured longitudinally thereof to the rear ends of said bars, said bars being formed of two parts longitudinally adjustable with relation to each other, two cross bars for connecting the bumper supporting bars at their front and rear end portions, said connecting bars being each also formed with two parts adjustably connected, two luggage supporting bars secured at their ends to said connecting bars and each formed of two parts adjustably connected, each part having an upwardly extending portion to receive and engage an article of luggage to be carried, and straps secured to said upwardly extended parts and designed to be passed over the article to be carried, for the purposes stated.

3. In a device of the class described, the combination of two flat bars designed to be secured to an automobile chassis and having their rear ends formed into loops, two bumper members each comprising a flat body portion having its ends curved forwardly then inwardly and then curved rearwardly to a point spaced apart from the bumper body and then extended outwardly, and bolts passed through the loops thus formed in said bumper members and also through the loop formed in the supporting bar member for adjustably and firmly connecting said parts and for permitting the body of the bumper to be moved forwardly before engaging said bolt receiving loops, for the purposes stated.

Des Moines, Iowa, February 17, 1925.

BRUCE BURD.